United States Patent [19]
Janson

[11] 4,105,554
[45] Aug. 8, 1978

[54] OIL SPILL RETRIEVAL SYSTEM

[76] Inventor: John J. Janson, 14103 Blackburn, Livonia, Mich. 48154

[21] Appl. No.: 802,026

[22] Filed: May 31, 1977

[51] Int. Cl.² ............................................. E02B 15/04
[52] U.S. Cl. ............................. 210/96 R; 210/242 S; 210/257 R; 210/DIG. 25
[58] Field of Search ............... 210/96 R, 109, 242 S, 210/257 R, 258, DIG. 25, DIG. 26

[56] References Cited
U.S. PATENT DOCUMENTS

| | | | |
|---|---|---|---|
| 3,253,711 | 5/1966 | Young | 210/96 R X |
| 3,426,902 | 2/1969 | Kilpert et al. | 210/DIG. 26 |
| 3,495,561 | 2/1970 | Trapp | 210/242 S X |
| 3,656,624 | 4/1972 | Walton | 210/242 S |
| 3,700,109 | 10/1972 | Lasko | 210/242 S |
| 3,731,813 | 5/1973 | Tipton | 210/242 A S |
| 3,884,807 | 5/1975 | Heddon | 210/DIG. 25 |
| 3,922,225 | 11/1975 | Strain | 210/242 S |
| 3,957,646 | 5/1976 | Wickert | 210/DIG. 25 |

*Primary Examiner*—Charles N. Hart
*Assistant Examiner*—Robert H. Spitzer
*Attorney, Agent, or Firm*—Harness, Dickey & Pierce

[57] ABSTRACT

An oil spill retrieval system for retrieving spilled oil from the surface of a body of water and including a boat having means for collecting the oil from the water surface and having means for processing the collected oil and water collected therewith to remove the oil from the water and to return the cleaned water to the body of water.

13 Claims, 3 Drawing Figures

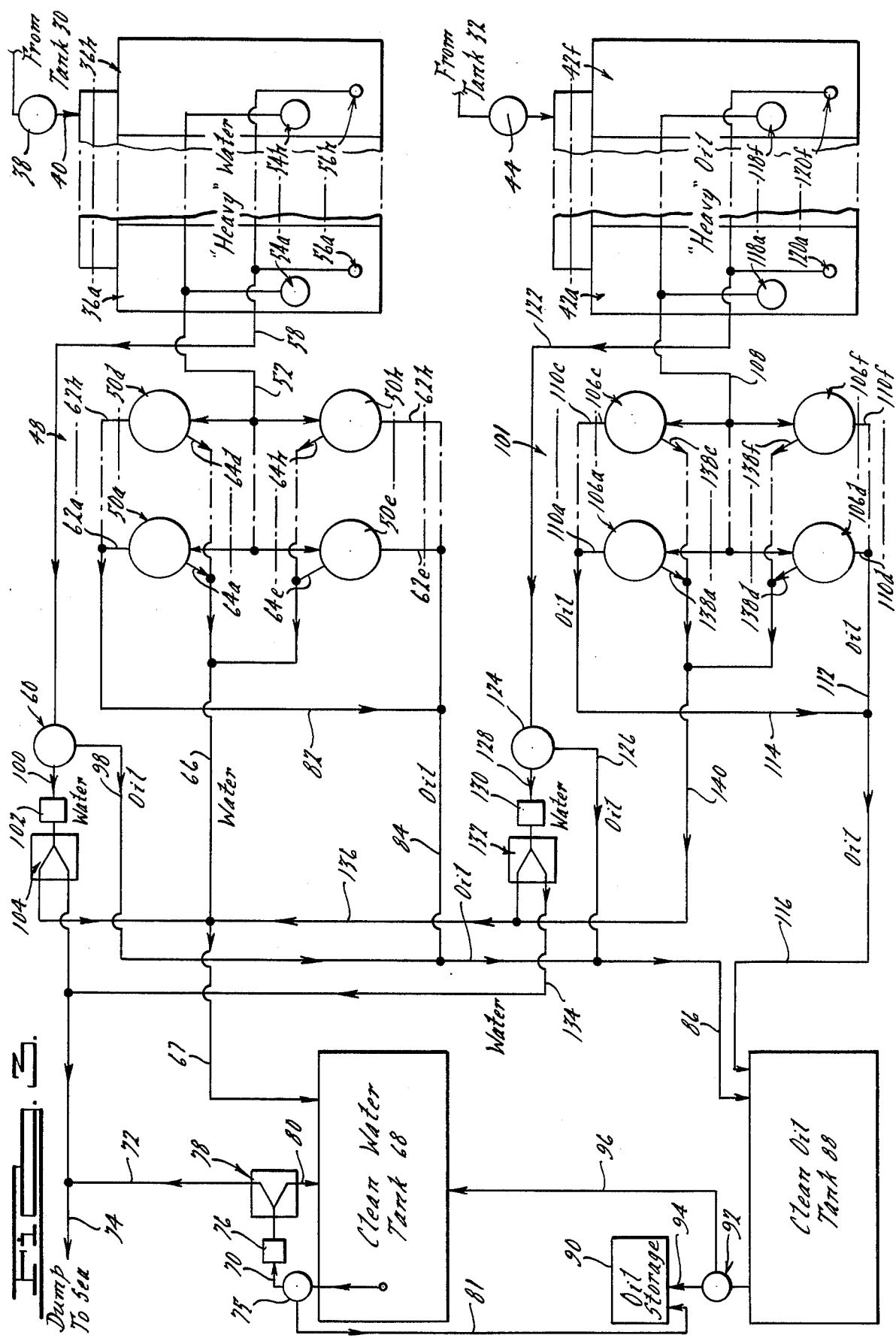

4,105,554

OIL SPILL RETRIEVAL SYSTEM

SUMMARY BACKGROUND OF THE INVENTION

The present invention relates to a system on a boat for retrieving oil spills and more particularly to such a system including means on the boat for separating the oil and water collected therefrom.

The risks of oil spills is considerable in view of the increase in offshore drilling and the shipment of oil via large tankers; the problem is compounded because of the large volumes of oil involved.

The system of the present invention provides a means for collecting the oil from the surface of the water and processing the collected oil so as to remove the water therefrom. The system includes a boat which carries the collecting and processing apparatus. In the retrieval portion of the process the oil is picked up from the surface of the water and as this is done a substantial quantity of the surface water is also picked up. While the boat has a selected storage capacity to hold the retrieved oil this capacity would be quickly exhausted since a significant amount of water would be picked up along with the oil. At the same time the combination of water and oil would have to eventually be disposed of at some suitable facility. In the present invention the boat is equipped with processing apparatus operable for separating the water from the oil. The water as it is processed would be monitored to determine the quantity of oil remaining in the water. When the water has been processed to a satisfactory point whereby the oil has been essentially removed, it can then be expelled back into its source. The removed oil would be stored. With the removal of the water the storage capacity can be devoted solely to the retrieved oil whereby the storage efficiency of the system is greatly enhanced. The significant feature here is not processing to provide clean oil but rather processing the mixture such that the removed oil has a minimum of water content to reduce the volume required to be stored until the boat can unload either at shore or to a sister ship. The other significant feature is to process the removed water until its contaminant level (with oil) is low enough to permit its discharge back to its source.

Therefore it is an object of the present invention to provide an oil spill retrieval system including apparatus for collecting the oil from the surface of a body of water and for processing the collected oil to remove the water collected with it and to return the cleaned water back to its source.

It is another object of the present invention to provide an improved oil retrieval system.

Other objects, features, and advantages of the present invention will become apparent from the subsequent description and the appended claims, taken in conjunction with the accompanying drawings, in which:

FIG. 3 is a schematic diagram of a portion of the system of the present invention.

Figure 2:
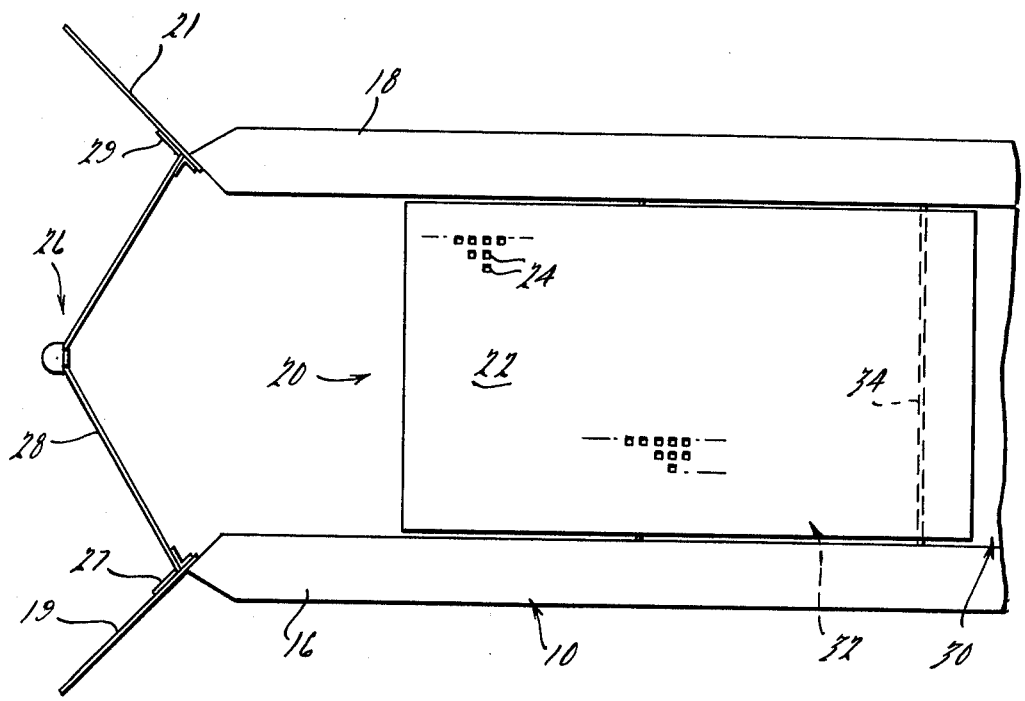
FIG. 2 is a plan view to increased scale of the front end of the boat of FIG. 1.
Figure 1:
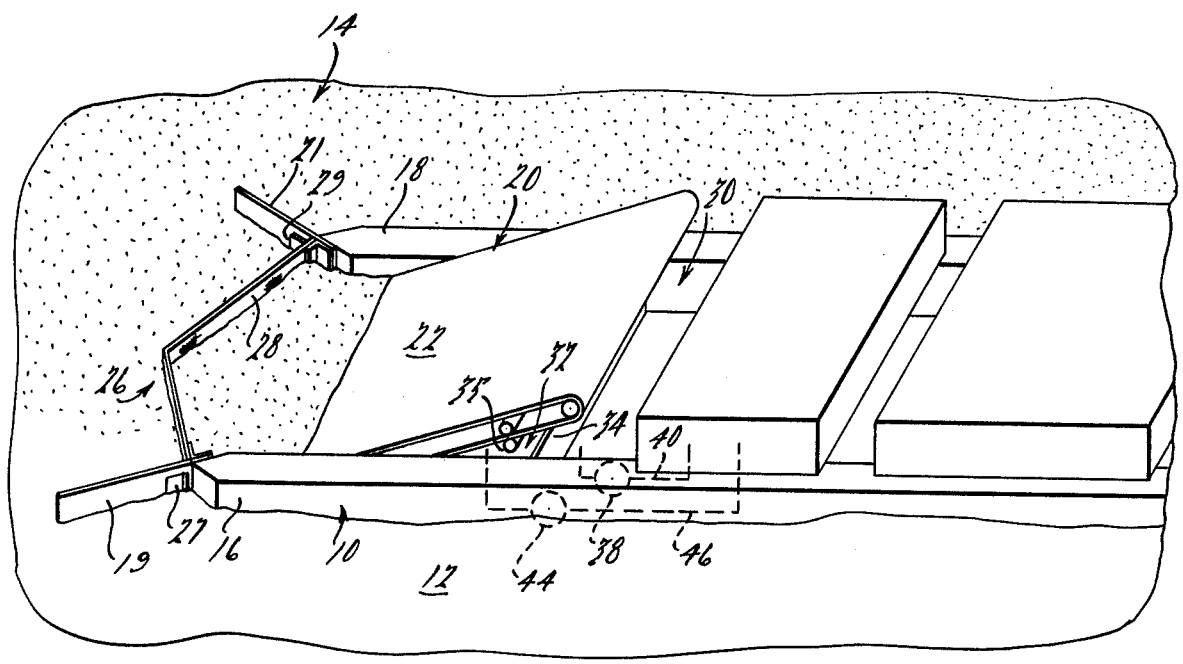
FIG. 1 is a pictorial view of a boat including the system of the present invention.

Looking now to FIG. 1 a boat 10 is shown on a body of water 12 and is adapted to collect and process the oil from an oil spill 14. The boat 10 is preferably of a pontoon or split hull type and includes two separated body sections 16 and 18. A belt conveyor 20 is located between the sections 16 and 18 and is operable for conveying the surface water including the oil up from the water level into holding tanks for further processing. The belt conveyor 20 can include a belt 22 having a waffled outer surface defined by a plurality of pockets 24 such that the water and oil can be more readily picked up and conveyed.

In operation the boat 10 is moved along the edge of the oil spill 14 such that the oil will be guided between the body sections 16 and 18 and towards the belt conveyor 20. A pair of diverging guides 19 and 21 extend from the front of boat 10 and act as a funnel for directing the oil spill 14 between the sections 16 and 18. A relatively large mesh screen assembly 26 is secured at the forward portion of boat 10. Thus floating debris will not be permitted access to the belt conveyor 20. The screen assembly 26 is arranged to define a V shape such that debris will tend to be deflected to one side or the other. The screen assembly 26 is preferably a self cleaning screen 28. A pair of gates 27 and 29 are located near the juncture of guides 19 and 21 and the adjacent screen assembly 26 and are selectively actuable to an open position to permit collected debris to be exited when the gates 27 and 29 are opened.

The belt conveyor 20 collects a combination of water and oil from the surface of the fluid between the body sections 16 and 18 and conveys the same to a primary receiving and holding tank 30. The receiving tank 30 is separated from a second holding tank 32 by means of a wall 34. The conveyor 20 includes a ringer roll 35 located on the return side of belt 22 and is actuable to apply pressure to the belt 22 to squeeze therefrom the remaining oil and water mixture which will be more heavily concentrated with oil. Thus the tank 30 will hold a mixture of predominantly water with oil while the second tank 32 will hold a mixture having more oil with the water. The receiving tank 30 is preferably larger in capacity than the second tank 32.

In the present invention, the mixture of oil and water in tanks 30 and 32 is processed separately in parallel systems. In the following discussion fluid from tank 30 shall be referred to as heavy water while the fluid from tank 32 shall be referred to as heavy oil. Thus the fluid in receiving tank 30 is transmitted to a plurality of heavy water processing tanks 36a–36h via a pump 38 and fluid line 40. At the same time heavy oil is transmitted from receiving tank 32 to a lesser plurality of heavy oil processing tanks 42a–42f via a pump 44 and fluid line 46. The tanks 36a–36h and 42a–42f are sequentially filled and, as will be seen, the fluid therefrom is sequentially processed. Note that a greater number of tanks 36a–36h (and hence greater capacity) are provided for the heavy water storage than are provided by tanks 42a–42f for the heavy oil storage.

The heavy water from tanks 36a–36h is first processed via a centrifugal separating section 48 which comprises a plurality of centrifugal separators 50a–50h. Each separator 50a–50h is separately connected to one of the heavy water tanks 36a–36h and this connection is schematically shown as a single line 52. Fluid is pumped from each tank 36a–36h to its associated centrifugal separators 50a–50h via pumps 54a–54h, respectively. The pumps 54a–54h are located between one half and two thirds of the distance from the top of the tanks 36a–36h so that the heavier concentrations of fluid with oil is taken off. At the same time pumps 56a–56h in tanks 36a–36h, respectively, are separately connected to a fluid line 58 connected to another centrifugal separator 60. The pumps 56a–56h are located proximate the bottom of tanks 36a–36h whereby fluid which is lower in oil content will be transmitted. In operation pumps 54a–54h are actuated first and the fluid pumped down to a level proximate the individual pumps. Next the pumps 56a–56h are actuated and the remaining fluid is pumped out for processing. The above pumping and processing sequence can be done for the separate tanks 36a–36h in a selected order such that processing can be a continuous operation. Thus note that both in the original collection tanks 30 and 32 a rough natural separation of water and oil is provided and this is continued in the subsequent holding tanks 36a–36h for the heavy water from tank 30 and, as will be seen, is also continued in the holding tanks 42a–42f for the heavy oil from tank 32.

Thus the more concentrated oil at lines 52 are processed in centrifugal separators 50a–50h. Each separator has separate outputs 62a–62h for the oil and 64a–64h for the water. The water outputs 64a–64h are connected to a fluid line 66 which in turn is connected to the inlet of a clean tank 68 via line 67. Note, it is important that the water before being returned to its source of origin be adequately cleaned of its oil content and hence a final separation stage is provided for the fluid in clean tank 68. The water in clean tank 68 can be returned to the sea or lake of origination via lines 70, 72 and 74. First, however, the water is sent through a final separator stage including centrifugal separator 75. The water being discharged at line 70 is monitored for oil content via a fluid monitor 76 (which can be a turbidimeter of known construction) and if the water is sufficiently free of oil it will be then pumped out to the sea, etc. A two way valve 78 is operative with monitor 76 and in the event the water to be discharged is not sufficiently free of oil, valve 78 will be actuated to block passage to discharge line 72 but will return the water to the clean tank 68 via line 80 for another cycle of separation. The oil separated by separator 75 will be transmitted to another clean tank 88 for processing oil via line 81.

At the same time, the oil separated from the separators 50a–50h is transmitted via lines 82, 84 and 86 to the second clean tank 88 for final filtering. Here a final separation of oil from the water takes place and the resultant oil is transmitted to oil storage tanks 90 via a centrifugal separator 92 and line 94. The water from the separator 92 is transmitted to the clean water tank 68 via line 96.

Going back to the fluid from heavy water tanks 36a–36h, the lower oil concentration fluid transmitted to separator 60 is processed and the oil transmitted from line 98 to line 86 and thence to the clean oil tank 88 where it is processed as previously described. The water from separator 60 is transmitted via line 100 and may be clean enough for discharge. However, a monitor 102 (like monitor 76) cooperates with a two way valve 104 (in the same manner as valve 78). Thus if the water is adequately free of oil, valve 104 will connect line 100 to discharge line 74; if not, the valve 104 will block discharge and connect line 100 to line 67 for transmission to the clean water tank 68 where it is processed as previously described.

The heavy oil at tanks 42a–42f is processed via separator stage 101 in a manner similar to that described above for the heavy water at tanks 32a–36h. Each tank 42a–42f is separately connected to a centrifugal separator 106a–106f via separate lines schematically shown as a single line 108. Separators 106a–106f have oil outlets 110a–110f all of which are connected to the inlet of clean oil tank 88 via fluid lines 112, 114 and 116. Note again that the fluid at line 108 to the inlets of separators 106a–106f is taken from the upper one half to two thirds of tanks 42a–42f via pumps 118a–118f, respectively. This again provides for a course separation of fluid from tanks 42a–42f.

At the same time, however, fluid from proximate the bottom of the tanks 42a–42f is taken off via pumps 120a–120f and lines 122. This fluid, having a lower oil concentration, is transmitted to the inlet of a centrifugal separator 124. Again the pumps 118a–118f are operated first and then the pumps 120a–120f are operated. The separated oil from separator 124 is transmitted to the clean oil tank 88 via line 126 where it is processed in the manner described. At the same time the water separated at separator 124 may be in a condition for discharge. Hence the water at line 128 is transmitted via a monitor 130 (similar to monitor 26) and to a two way valve 132 (similar to valve 78). If the water is sufficiently free of oil, monitor 130 will place valve 132 in its discharge condition connecting line 128 with line 134 and outlet line 74. If it is not sufficiently free of oil, valve 132 will block discharge and connect the fluid to clean water tank 68 via lines 136 and 67 for further processing as described.

The separators 106a–106f also have outlets 138a–138f for the separated water. These outlets are also connected to the clean water tank 68 via lines 140, 136 and 67.

With the system as shown it is significant that the discharged water is substantially free of oil. It is also significant that the water content in the oil eventually stored, as an oil storage tank 90, has been drastically reduced whereby the storage capacity of the boat 10 can be effectively utilized.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. An oil retrieval system for retrieving oil spills and the like from bodies of water such as seas, lakes or the like and being operable from a boat, said system comprising: collecting means operatively connected with the boat for collecting the oil from the surface of the water, said collecting means collecting a mixture of oil and water, receiving tank means located on the boat for receiving the mixture of oil and water, separating means operatively connected with said receiving tank means for separating the oil and water, storage means for receiving and holding the separated oil, discharge means for discharging the water back to the body of water, monitor means for analyzing the water to be discharged and providing a first signal when the quantity of oil in the water is at a preselected low level and a second signal when the quantity of oil in the water is above said low level, said discharge means operable for discharging the water in response to said first signal and response to said second signal for transmitting the water to said separating means for an additional cycle, said boat being of a twin hull construction and with said collecting means located between said twin hulls, screen means including a screen structure located in front of said collecting means to block out debris from said collecting means, said screen means further comprising guide means for providing a funnel like construction for guiding the fluid in between said twin hulls and to said screen structure, said guide means having at least one gate and with said screen structure defining a V-shape and cooperating with said one gate for directing debris thereto whereby debris can be exited.

2. The system of claim 1 with said separating means comprising fluid separating means for separating the oil and water, a clean oil tank and a clean water tank, and conduit means for transmitting the oil from said separating means to said clean oil tank and for transmitting the water from said separating means to said clean water tank.

3. The system of claim 2 with said separating means comprising means for separating the mixture of oil and water into a first mixture and a second mixture with said first mixture having a heavier concentration of oil than said second mixture, said fluid separating means comprising first fluid separating means for receiving said first mixture and for separating the water and oil from said first mixture and transmitting the oil to said clean oil tank and the water to said clean water tank, and second fluid separating means for receiving said second mixture and for separating the water and oil from said second mixture and transmitting the oil to said clean oil tank and the water to said clean water tank.

4. The system of claim 3 with said separating means comprising third fluid separating means connected to said clean water tank for separating the water and oil and transmitting the oil to said clean oil tank and the water to said discharge means.

5. The system of claim 2 with said receiving means comprising a first receiving tank and a second receiving tank and initial coarse separation means operatively connected with said collecting means and with said first and second receiving tanks for coarsely separating the oil and water from said collecting means and for transmitting to said second receiving tank a mixture more heavily concentrated with oil than said first receiving tank.

6. The system of claim 5 with said fluid separating means comprising first and second fluid separating means operatively connected with said first receiving tank and third and fourth fluid separating means operatively connected with said second receiving tank, said first, second, third and fourth fluid separating means operative on the mixture of water and oil received to separate the water and oil and to transmit the oil to said clean oil tank and the water to said clean water tank, said first and second fluid separating means operative to receive the mixture of oil and water from said first receiving tank and said second and third fluid separating means operative to receive the mixture of oil and water from said second receiving tank, and first coarse separating means for coarsely separating the oil and water in said first receiving tank and transmitting a mixture of fluid more heavily concentrated with oil to said first fluid separating means and a mixture of fluid less heavily concentrated with oil to said second fluid separating means and second coarse separating means for coarsely separating the oil and water in said second receiving tank and transmitting a mixture of fluid more heavily concentrated with oil to said third fluid separating means and a mixture of fluid less heavily concentrated with oil to said fourth fluid separating means.

7. The system of claim 6 with said monitor means comprising a first monitor means operatively connected with said second fluid separating means for analyzing the water therefrom and for providing said first and second signals, first valve means responsive to said first signal for transmitting the water to said discharge means and responsive to said second signal for transmitting the water to said clean water tank.

8. The system of claim 7 with said monitor means comprising second monitor means operatively connected with said fourth fluid separating means for analyzing the water therefrom and for providing said first and second signals, second valve means responsive to said first signal for transmitting the water to said discharge means and responsive to said second signal for transmitting the water to said clean water tank.

9. The system of claim 8 with said fluid separating means comprising a fifth fluid separating means operatively connected with said clean water tank for separating the oil and water and transmitting the oil to said clean oil tank and the water to said discharge means, said monitor means including third monitor means operatively connected with said fluid separating means for analyzing the water therefrom and for providing said first and second signals, third valve means responsive to said first signal for transmitting the fluid to said discharge means and responsive to said second signal for transmitting the water back to said clean water tank.

10. The system of claim 9 with said fluid separating means comprising a sixth fluid separating means operatively connected with said clean oil tank for separating the oil and water and transmitting the oil to said storage means and the water to said clean water tank.

11. The system of claim 1 with said screen structure being self cleaning.

12. An oil retrieval system for retrieving oil spills and the like from bodies of water such as seas, lakes or the like and being operable from a boat, said system comprising: collecting means operatively connected with the boat for collecting the oil from the surface of the water, said collecting means collecting a mixture of oil and water, receiving tank means located on the boat for receiving the mixture of oil and water, separating means operatively connected with said receiving tank means for separating the oil and water, storage means for receiving and holding the separated oil, discharge means for discharging the water back to the body of water, monitor means for analyzing the water to be discharged and providing a first signal when the quantity of oil in the water is at a preselected low level and a second signal when the quantity of oil in the water is above said low level, said discharge means operable for discharging the water in response to said first signal and response to said second signal for transmitting the water to said separating means for an additional cycle, said separating means comprising fluid separating means for separating the oil and water, a clean oil tank and a clean water tank, and conduit means for transmitting the oil from said fluid separating means to said clean oil tank and for transmitting the water from said fluid separating means to said clean water tank, said receiving tank means comprising a first receiving tank and a second receiving tank, an initial coarse separation means operatively connected with said collecting means and with said first and second receiving tanks for coarsely separating the oil and water from said collecting means and for transmitting to said second receiving tank a mixture more heavily concentrated with oil than said first receiving tank, said fluid separating means comprising first and second fluid separating means operatively connected with said first receiving tank and third and fourth fluid separating means operatively connected with said second receiving tank, said first, second, third and fourth fluid separating means operative on the mixture of water and oil received to separate the water and oil and to transmit the oil to said clean oil tank and the water to said clean water tank, said first and second fluid separating means operative to receive the mixture of oil and water from said first receiving tank and said second and third fluid separating means operative to receive the mixture of oil and water from said second receiving tank, and first coarse separating means for coarsely separating the oil and water in said first receiving tank and transmitting a mixture of fluid more heavily concentrated with oil to said first fluid separating means and a mixture of fluid less heavily concentrated with oil to said second fluid separating means and second coarse separating means for coarsely separating the oil and water in said second receiving tank and transmitting a mixture of fluid more heavily concentrated with oil to said third fluid separating means and a mixture of fluid less heavily concentrated with oil to said fourth fluid separating means, said monitor means comprising a first monitor means operatively connected with said second fluid separating means for analyzing the water therefrom and for providing said first and second signals, first valve means responsive to said first signal for transmitting the water to said discharge means and responsive to said second signal for transmitting the water to said clean water tank, said monitor means comprising second monitor means operatively connected with said fourth fluid separating means for analyzing the water therefrom and for providing said first and second signals, second valve means responsive to said first signal for transmitting the water to said discharge means and responsive to said second signal for transmitting the water to said clean water tank, said fluid separating means comprising a fifth fluid separating means operatively connected with said clean water tank for separating the oil and water and transmitting the oil to said clean oil tank and the water to said discharge means, said monitor means including third monitor means operatively connected with said fluid separating means for analyzing the water therefrom and for providing said first and second signals, third valve means responsive to said first signal for transmitting the fluid to said discharge means and responsive to said second signal for transmitting the water back to said clean water tank, said fluid separating means comprising a sixth fluid separating means operatively connected with said clean oil tank for separating the oil and water and transmitting the oil to said storage means and the water to said clean water tank, said boat being of a twin hull construction and with said collecting means located between said twin hulls, screen means including a screen structure located in front of said collecting means to block out debris from said collecting means, said screen means further comprising guide means for providing a funnel like construction for guiding the fluid in between said twin hulls and to said screen structure, said guide means having at least one gate and with said screen structure defining a V-shape and cooperating with said one gate for directing debris thereto whereby debris can be exited.

13. The system of claim 12 with said screen structure being self cleaning.

* * * * *